(12) United States Patent
Diede

(10) Patent No.: US 6,320,532 B1
(45) Date of Patent: Nov. 20, 2001

(54) LOW POWER RADAR LEVEL TRANSMITTER HAVING REDUCED GROUND LOOP ERRORS

(75) Inventor: Kurt C. Diede, Apple Valley, MN (US)

(73) Assignee: Rosemount Inc., Eden Prairie, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,143

(22) Filed: May 27, 1999

(51) Int. Cl.⁷ .................................................. G01S 13/32
(52) U.S. Cl. .......................... 342/124; 342/159; 342/198
(58) Field of Search .................................... 342/124, 135, 342/159, 198, 203

(56) References Cited

U.S. PATENT DOCUMENTS

| | | | |
|---|---|---|---|
| 3,665,466 | 5/1972 | Hibbard | 343/12 R |
| 3,812,422 | 5/1974 | De Carolis | 324/58.5 B |
| 3,900,260 | * 8/1975 | Wendt | 356/5.12 |

(List continued on next page.)

FOREIGN PATENT DOCUMENTS

| | | |
|---|---|---|
| 0882956 A2 | 12/1998 | (EP) . |
| 0882957 A2 | 12/1998 | (EP) . |
| 0 928 974 A2 | 7/1999 | (EP) . |
| 09069731A | * 3/1997 | (JP) ................................ H03D/7/00 |
| 697940A | * 3/1997 | (SU) ............................... G01B/23/02 |
| 97/06448 | 2/1997 | (WO) . |

OTHER PUBLICATIONS

"Novel Methods of Measuring Impurity Levels in Liquid Tanks", IEEE MTT–S International Microwave Symposium Digest, US, New York, IEEE, pp. 1651–1654 (1997).

"Micropower Impulse Radar Technology and Application", by Mast et al., U.S. Dept. of Energy, Lawrence Livermore National Laboratory, UCRL–ID 130474 (Apr. 15, 1998).

"Radar Level Technology Offers Accurate, Noncontact Measurements" by Fred Fitch, Special Report Flow, Level, Pressure, I&CS, pp. 27–30 (Jan. 1996).

"Gauging and Level Measurement for Liquids, Interface and Granular Materials", *Reflex–Radar*, KROHNE, Technical Data BM 100, BM 100 EEx (12/96).

"Eclipse Guided Wave Radar", Magnetrol, printed from http://www.magnetrol.com/html/eclipse.htm (Jul. 23, 1998).

(List continued on next page.)

Primary Examiner—John B. Sotomayor
(74) Attorney, Agent, or Firm—Westman, Champlin & Kelly, P.A.

(57) ABSTRACT

A low power radar level transmitter having reduced ground loop errors and a related method are disclosed. A microwave termination is couplable to a reference voltage such as earth ground and is coupled to a microwave transceiver through at least one low frequency isolator. The microwave transceiver generates a microwave signal along the termination which is reflected by a process product interface. A level calculator is coupled to the microwave transceiver to calculate a level of the process product based upon the received, reflected signal. A process loop communicator is coupled to the level calculator and couplable to a process control loop to communicate the calculated level across the process control loop. A power supply is couplable to the process control loop and provides power to all electrical components of the transmitter with energy received from the process control loop.

16 Claims, 4 Drawing Sheets

U.S. PATENT DOCUMENTS

| | | | |
|---|---|---|---|
| 3,995,212 | | 11/1976 | Ross .................................. 324/58.5 B |
| 4,044,355 | * | 8/1977 | Edvardsson ........................... 342/124 |
| 4,161,731 | | 7/1979 | Barr ....................................... 343/14 |
| 4,435,709 | * | 3/1984 | Kipp ..................................... 342/101 |
| 4,972,386 | * | 11/1990 | Lau ......................................... 367/99 |
| 5,157,337 | | 10/1992 | Neel et al. ............................ 324/632 |
| 5,327,139 | | 7/1994 | Johnson ................................. 342/22 |
| 5,365,178 | * | 11/1994 | Van Der Pol ........................ 324/644 |
| 5,440,310 | * | 8/1995 | Schreiner ............................ 342/124 |
| 5,500,649 | | 3/1996 | Mowrey et al. ....................... 342/22 |
| 5,609,059 | | 3/1997 | McEwan ............................ 73/290 R |
| 5,610,611 | | 3/1997 | McEwan ................................ 342/89 |
| 5,656,774 | | 8/1997 | Nelson et al. .......................... 73/290 |
| 5,659,321 | * | 8/1997 | Burger et al. ........................ 342/124 |
| 5,661,251 | | 8/1997 | Cummings et al. ................ 73/866.5 |
| 5,672,975 | | 9/1997 | Kielb et al. .......................... 324/644 |
| 5,726,578 | | 3/1998 | Hook .................................... 324/643 |
| 5,734,346 | * | 3/1998 | Richardson et al. ................. 342/124 |
| 5,835,053 | | 11/1998 | Davis ..................................... 342/22 |
| 5,898,308 | | 4/1999 | Champion ........................... 324/643 |
| 6,130,637 | * | 10/2000 | Meszaros et al. ................... 342/124 |
| 6,166,681 | * | 12/2000 | Meszaros et al. ................... 342/124 |
| 6,184,818 | * | 2/2001 | Meinel ................................ 342/124 |

OTHER PUBLICATIONS

"Approval Standard Intrinsically Safe Apparatus and Associated Apparatus for use in Class I, II and III, Division 1 Hazardous (Classified) Locations", Factory Mutual Research, pp. 1–70 (Oct. 1988).

"Measuring Fluid Levels with Radar", by Steven Ashley, *Mechanical Engineering*, pp. 82–83 (Jan. 1996).

"World's Fastest Solid–State Digitizer", Lawrence Livermore National Laboratory, *Energy & Technology Review*, pp. S1–S6 (Apr. 1994).

"Low–Cost Wideband Spread–Spectrum Device Promises to Revoluionize Radar Proximity Sensors", *Technology Advances*, Electronic Design (Jul. 25, 1994).

* cited by examiner

LOW POWER RADAR LEVEL TRANSMITTER HAVING REDUCED GROUND LOOP ERRORS

CROSS REFERENCE TO RELATED APPLICATIONS

This application is related to U.S. application Ser. No. 09/235,114, filed Jan. 21, 1999 entitled "MEASUREMENT OF PROCESS PRODUCT DIELECTRIC CONSTANT USING A LOW POWER RADAR LEVEL TRANSMITTER" and U.S. application Ser. No. 09/234,999, filed Jan. 21, 1999 entitled "MULTIPLE PROCESS PRODUCT INTERFACE DETECTION FOR A LOW POWER RADAR LEVEL TRANSMITTER" now allowed.

BACKGROUND OF THE INVENTION

The process control industry employs process variable transmitters to monitor process variables associated with substances such as solids, slurries, liquids, vapors, and gasses in chemical, pulp, petroleum, pharmaceutical, food and other food processing plants. Process variables include pressure, temperature, flow, level, turbidity, density, concentration, chemical composition and other properties. A process variable transmitter can provide an output related to the sensed process variable over a process control loop to a control room, such that the process can be monitored and controlled.

The process control loop can be any configuration of two or more conductors that are capable of passing signals related to process information. For example, the process control loop can be a two-wire, 4–20 mA process control loop. A process variable transmitter coupled to such a process control loop controls the amount of current flowing through the loop such that the current corresponds to the process variable. In some process control loop embodiments, the energization levels can be low enough that even under fault conditions the loop generally will not contain enough electrical energy to generate a spark. This facilitates compliance with the intrinsic safety specification as set forth in the Factory Mutual Approval Standard entitled "Intrinsically Safe Apparatus and Associated Apparatus for Use in Class I, II, and III, Division 1 Hazardous (Classified) Locations," Class Number 3610, published October 1988. Intrinsic safety compliance is particularly relevant in flammable environments. Low power process variable transmitters can operate on such low energy levels that they can receive all required electrical power from a 4–20 mA process control loop. The process control loop may also have digital signals superimposed on the loop according to a process industry standard protocol such as the HART® digital protocol.

Low Power Time Domain Reflectometry Radar (LPTDRR) instruments have been used recently to measure the level of products (either liquids or solids) in storage vessels. In Time Domain Reflectometry, electromagnetic energy is transmitted from a source, and reflected at a discontinuity. The travel time of the received energy is based on the media through which it travels as well as the distance traveled. One type of LPTDRR is known as Micropower Impulse Radar (MIR), which was developed by the Lawrence Livermore National Laboratory.

Transmitters used in the industrial marketplace see many harsh environmental conditions. Microwave level transmitters can be used in environments with explosive gases. Therefore, in such environments great care must be taken to make the transmitters intrinsically safe, explosion proof, or both. Generally, the microwave termination or antenna must be electrically coupled to a reference voltage such as earth ground so that electrical energy cannot build on the termination and potentially generate a spark. Further, level transmitters can frequently be located considerable distances, reaching 1000 feet or more, from the control room which supplies power for the two-wire loop. The considerable distances between the control room and the transmitter can cause ground loop errors in the 4–20 mA signals. Ground loop error is any undesired voltage drop (noise) between two physically separated connections to ground. Ground loop errors occur because of an impedance between the two connections (typically wire resistance and inductance) and a noise current flowing through the impedance. Additionally, various other industrial devices can create electrical noise at frequencies both higher and lower than the microwave frequency. Such noise can adversely affect transmitter operation.

SUMMARY OF THE INVENTION

A low power radar level transmitter having reduced ground loop errors is disclosed. A microwave termination is couplable to a reference voltage such as earth ground and is coupled to a microwave transceiver through at least one low frequency isolator. The microwave transceiver generates a microwave signal with the termination which is reflected by a process product interface. A level calculator is coupled to the microwave transceiver to calculate a level of the process product based upon the received, reflected signal. A process loop communicator is coupled to the level calculator and is couplable to a process control loop to communicate the calculated level across the process control loop. A power supply is also couplable to the process control loop and provides power to all electrical components of the transmitter with energy received from the process control loop.

A method of measuring a height of a process product with a low power radar level transmitter is also disclosed. A microwave signal is generated and transmitted with a microwave termination. Direct current (DC) flow is inhibited with at least one low frequency isolator to reduce ground loop errors. Process product height is calculated based upon reflection of the transmitted signal by the process product.

DETAILED DESCRIPTION OF THE EMBODIMENTS

Although the present invention will be described with reference to embodiments of low power radar level transmitters and the manner in which microwave termination coupling is effected, workers skilled in the art will recognize that changes may be made in form and detail without departing from the spirit and scope of the invention, which are defined by the appended claims.

Figure 1:
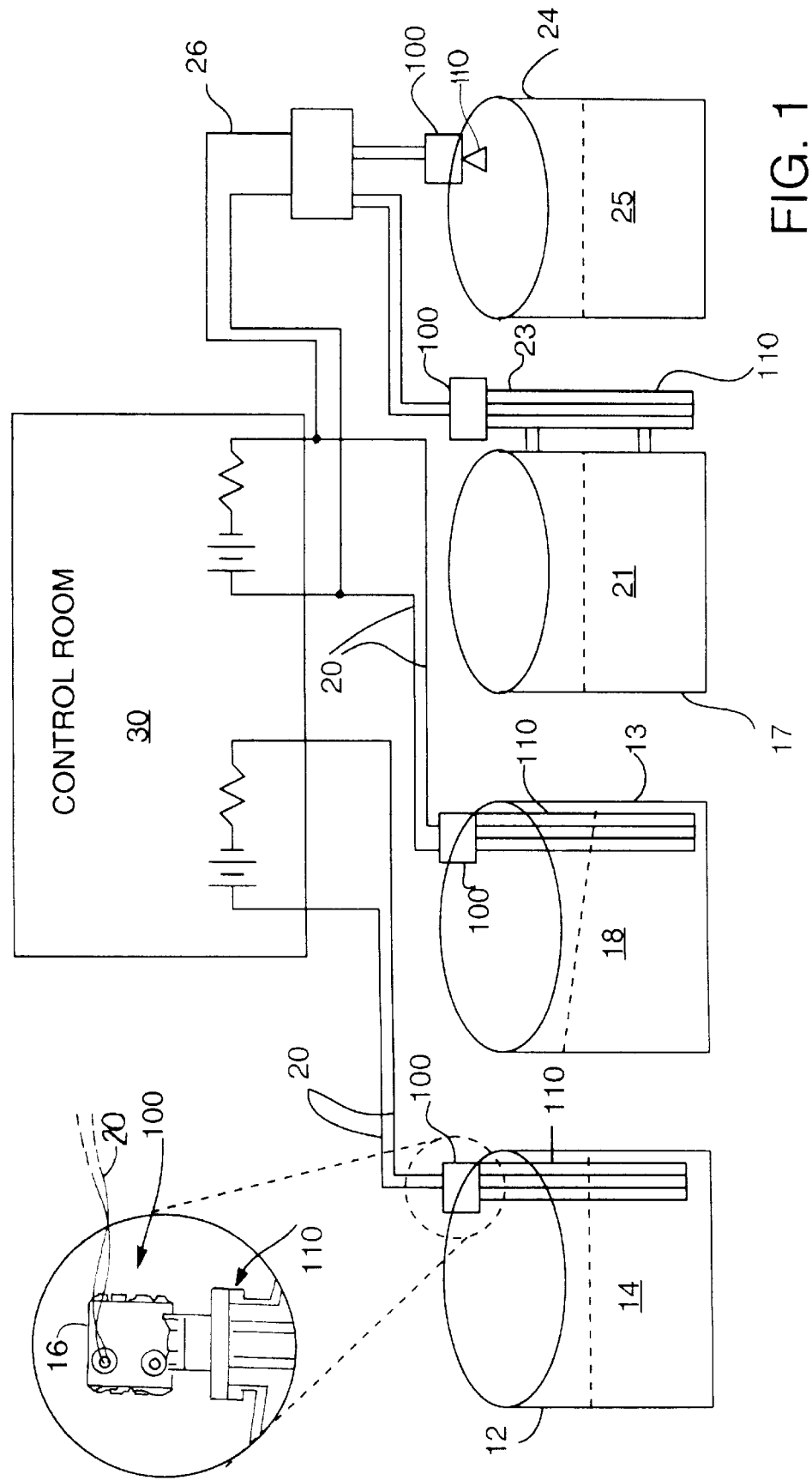
FIG. 1 is a diagram of the environment of low power radar level transmitters in accordance with embodiments of the invention.

FIG. 1 illustrates low power radar level transmitters 100 operating in the environment of being mounted to storage tanks 12, 13, 17, 24 containing process products 14, 18, 21 and 25, respectively. As low power radar transmitters, transmitters 100 can be completely powered by energy received over a 4–20-mA process control loop.

Level transmitters 100 include housings 16 and terminations 110. Transmitters 100 are coupled to process control loops 20 in various configurations as shown in FIG. 1. For example, transmitters 100 can be coupled to control room 30 through junction box 26. Transmitters 100 transmit information related to heights of the process products over process control loops 20 to control room 30 (which is modeled as voltage sources and resistances) or to other devices (not shown) coupled to process control loops 20. Loops 20 are sources of power for transmitters 100 and can use any industry standard communications protocol such as 4–20 mA, Profibus, HART®, or Foundation™ Fieldbus. Foundation™ Fieldbus is a multi-drop digital communications protocol intended for connecting field instruments and other process devices in process control systems. The physical layer of the Foundation™, Fieldbus protocol is defined by Instrument Society of America standard ISA-S50.02-1992, and its draft 2 extension dated 1995.

FIG. 1 illustrates various applications in which radar level transmitters are useful. For example, process product 14 in tank 12 is a fluid, while process product 18 in tank 13 is a solid (shown with a given angle of repose). Process product 21 in tank 17 is a fluid the level of which is communicated to tube 23 into which one of terminations 110 extends. Tank 24 is shown containing product 25, and having a radiative-type termination mounted on top of tank 24. Although FIG. 1 shows tanks 12, 13, 17, and 24, embodiments may be practiced without tanks such as in a lake or reservoir.

Figure 2:
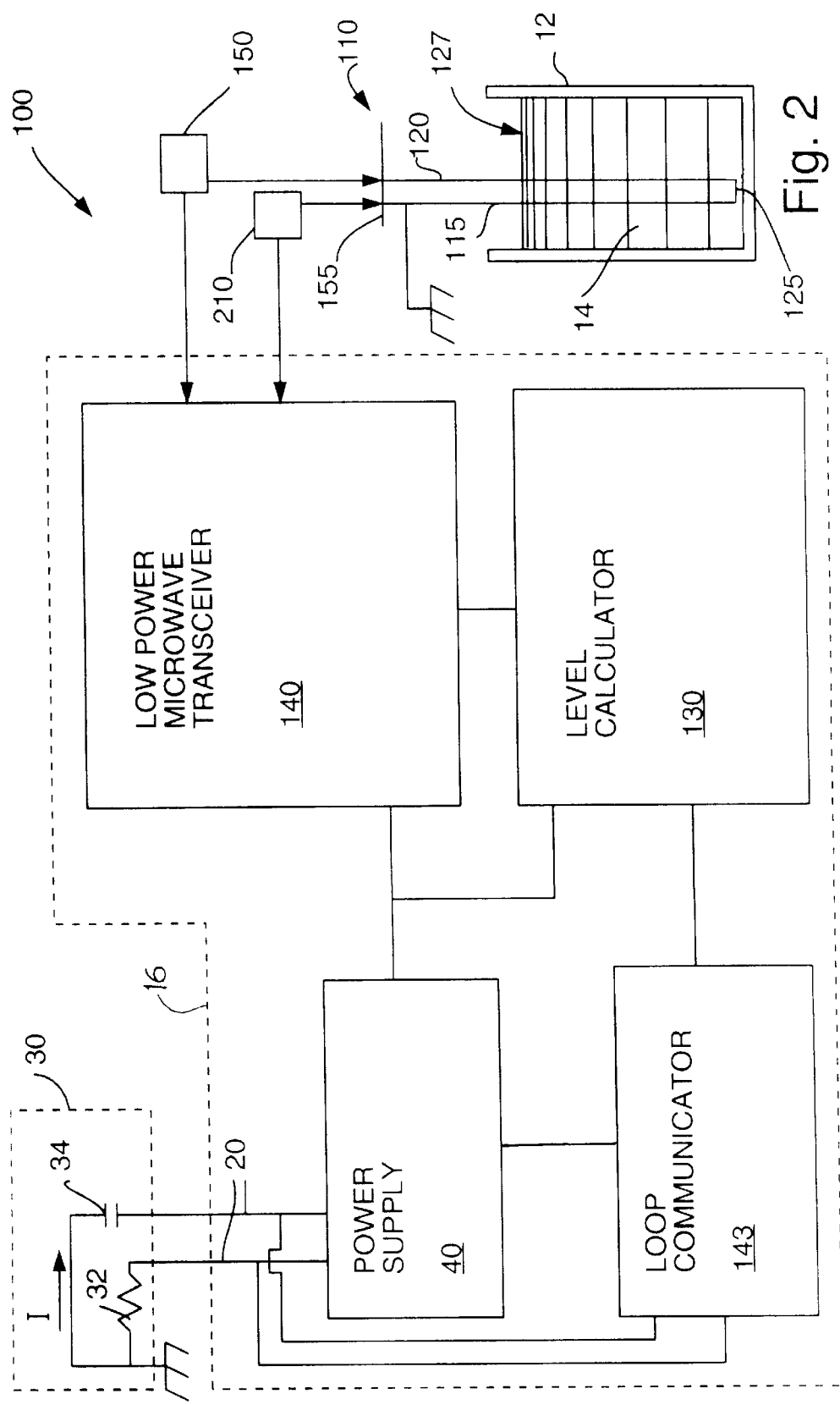
FIG. 2 is a block diagram illustrating circuitry of an embodiment of the invention.

FIG. 2 is a block diagram of low power radar level transmitter 100 coupled to control room 30 over process control loop 20. Voltage source 34 of control room 30 is coupled to a reference voltage such as earth ground to provide an earth-grounded power supply from which power is provided over loop 20 to transmitter 100. Electric circuitry carried in housing 16 of transmitter 100 includes level calculator 130, low power microwave transceiver 140, loop communicator 143 and power supply 40. Transmitter 100 also includes termination 110 extending into process product 14 contained in tank 12.

Termination 110 is electrically couplable to a reference voltage such as earth ground and is extendable into process product 14 in tank 12. Termination 110 is known in the level transmitter art and can be any appropriate transmission line, waveguide or antenna. A transmission line is a system of material boundaries forming a continuous path from one place to another and capable of directing transmission of electromagnetic energy along this path. In some embodiments, termination 110 is a twin lead antenna having leads or conductors 115 and 120 connected at bottom region 125 and extendable into product 14 in tank 12, and optionally having launch plate 155. Termination 110 can also be a monopole, coaxial, twin-line, single-line, microstrip or radiative horn termination with any appropriate number of leads.

Low power microwave transceiver 140 is operatively coupled to termination 110. Transceiver 140 can be any low power microwave transceiver operable within the power constraints of low power radar level transmitter 100. For example, transceiver 140 can be a micropower impulse radar (MIR) transceiver of the type discussed in detail in either of two patents issued to Thomas E. McEwan, U.S. Pat. No. 5,609,059 entitled ELECTRONIC MULTI-PURPOSE MATERIAL LEVEL SENSOR and U.S. Pat. No. 5,610,611 entitled HIGH ACCURACY ELECTRONIC MATERIAL LEVEL SENSOR. Transceiver 140 is adapted to generate a microwave signal with termination 110 and receive a microwave signal reflected from interface 127. The transmit signal can be at any of a wide range of frequencies, for example between about 250 MHz and about 20 GHz or more. In one embodiment, the frequency of the transmit signal is about 2 GHz. In another embodiment, the transmit signal pulse width ranges from about 200 picoseconds to about 2 nanoseconds corresponding roughly to a frequency between about 500 MHz and 5 GHz.

Level calculator 130 is coupled to microwave transceiver 140 and is adapted to calculate a process product height based upon the reflected microwave signal. Level calculator 130 uses known mathematical functions to derive data from the reflected pulses. Such mathematical functions can, for example, operate upon signal amplitude, signal flight time, signal slope, and signal area. Level calculator 130 calculates the level of process product 14 as a function of a time of flight of the reflected signal.

Loop communicator 143 is coupled to level calculator 130 and is couplable to process control loop 20. Loop communicator 143 is adapted to transmit information related to the process product height over process control loop 20. Product height information can be transmitted by loop communicator 143 digitally over two-wire loop 20 using digital circuit 56 under the control of Universal Asynchronous Receiver Transmitter (UART) 54 (shown in FIG. 3). Alternatively, loop communicator 143 can control the current level between, for example, 4 and 20 mA using a digital-to-analog converter or other appropriate device. In this manner, transmitter 100 can communicate product height information to control room 30 or to other controllers or devices coupled to process control loop 20.

Power supply 40 is coupled to low power microwave transceiver 140, level calculator 130, and loop communicator 143. Power supply 40 is couplable to process control loop 20 to receive power from loop 20 and provide the received power to low power microwave transceiver 140, level calculator 130, and loop communicator 143. Power supply 40 can also condition the received power for transceiver 140, level calculator 130, and loop communicator 143.

As shown in FIG. 2, termination 110 is coupled to low power microwave transceiver 140 through low frequency isolators 150, 210 which are adapted to substantially block low frequency signals and pass microwave signals. Isolators 150, 210 can also be adapted to block signals of substantially higher frequency than microwave signals as well. Thus, isolators 150, 210 can be bandpass filters. Isolators 150, 210 can also be capacitors embodied as discrete components or as coplanar designs each integrated into a pair of circuit traces. This coplanar capacitor design is illustrated in a book by Brian C. Wadell entitled, "Transmission Line Design Handbook", published in 1991, ISBN 0-89006-436-9.

Figure 3:
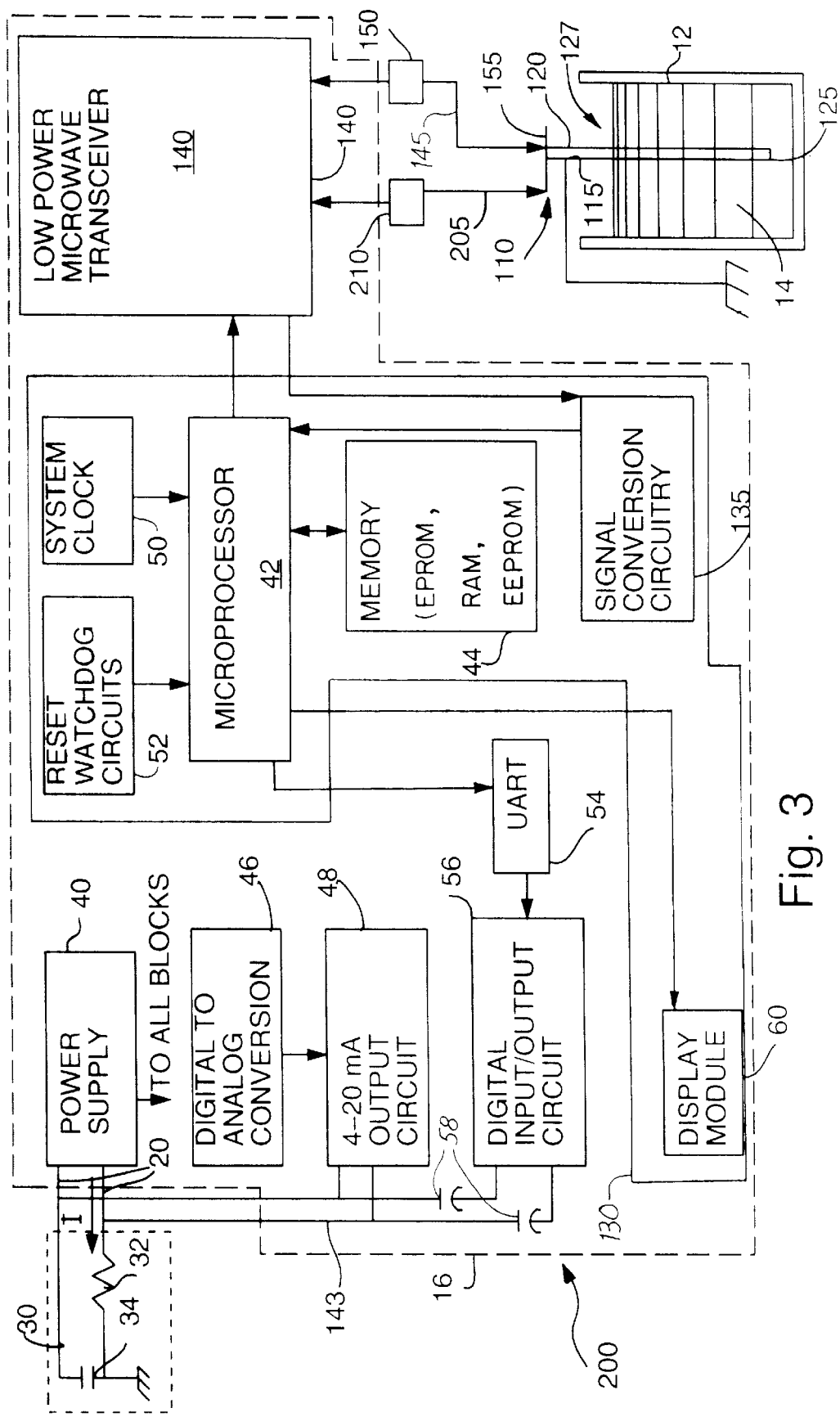
FIG. 3 is a block diagram illustrating the circuitry of FIG. 2 in greater detail.

FIG. 3 illustrates circuitry of the transmitter of FIG. 2 in greater detail. Level calculator 130 can include microprocessor 42, memory 44, system clock 50, reset circuitry 52, display module 60 and signal conversion circuitry 135. Microprocessor 42 is connected to UART 54 of loop communicator 143 which controls digital input/output circuit 56 and is coupled to process control loop 20 through direct current blocking capacitors 58. UART 54 can also be a part of microprocessor 42. Microprocessor 42 is also coupled to display module 60 and to low power microwave transceiver 140 for controlling transceiver 140 and/or for calculating product height or level based upon information received from transceiver 140.

Product height information can be transmitted by transmitter 100 digitally over process control loop 20 using digital circuit 56 under the control of UART 54. Alternatively, microprocessor 42 can control the current level (between, for example, 4 and 20 mA) using digital-to-analog converter 46 to control output circuit 48 and thus transmit information over process control loop 20. In one embodiment, microprocessor 42 can be set to provide a high output (for example 16 mA) on loop 20 if the product level is either above or below a threshold product level stored in memory 44. In this manner, transmitter 100 can communicate product height information to control room 30 or to other controllers or devices coupled to process control loop 20.

Signal conversion circuitry 135 can be any of a wide variety of devices capable of converting transceiver output signals and information into a form usable by microprocessor 42. For example, if transceiver 140 provides an analog output signal, circuitry 135 can be an analog-to-digital converter. However, if transceiver 140 is of the type which provides a digital output indicative of product height, circuitry 135 can be eliminated and the digital signals can be provided directly to microprocessor 42.

Transceiver 140 generates microwave signals which are provided to termination 110 via leads or connections 145 and 205. As is known in the art, a portion of the energy from the microwave signals is reflected at interface 127 between product 14 and the air (or at the interface between any two materials having different dielectric constants), which portion travels back up leads 115 and 120 of termination 110. Launch plate 155 can be included to generate a fiducial pulse which designates the beginning of a reference period indicative of the level of product 14. In other words, by causing a first reflection (a fiducial pulse) of the microwave signal at launch plate 155, a convenient reference is made available for comparison to the time that the signal reflected off of interface 127 is received. However, launch plate 155 is not the exclusive way to designate the start of the time period, and therefore can be omitted in some embodiments.

Transceiver 140 receives the fiducial pulse and the pulse reflected at interface 127, and provides to microprocessor 42 output signals or information which are indicative of the level of product 14 in tank 12. In some embodiments, transceiver 140 provides to microprocessor 42 the fiducial pulse and the pulse corresponding to microwave energy reflected at interface 127. In these embodiments, signal conversion circuitry 135 can be an analog-to-digital converter which digitizes the signals and provides them to microprocessor 42. Microprocessor 42 can then use system clock 50 to calculate a time difference between the occurrences of the fiducial and reflected pulses. This time difference is equal to the time of travel of the microwave signals down termination 110 to interface 127, and back up termination 110. This time of travel is indicative of the distance traveled by the microwaves, and is thus indicative of the level of product 14 in tank 12. The relationship between the distance traveled and the time of travel is shown in Equation 1.

$$D = \left(\frac{1}{\sqrt{\varepsilon_r}}\right) C \left(\frac{T}{2}\right) \qquad \text{Eq. 1}$$

where:

$T/2$ = one half of the travel time of the microwave pulse (the travel time required for the microwave pulse to travel down the probe to the interface);

$\varepsilon_r$ = the dielectric constant of the material through which the microwave pulse travels (for air, $\varepsilon_r = 1$);

$C$ = the speed of light; and $D$ = the distance traveled from the top of the probe to the interface.

In other embodiments of transceiver 140, such as those disclosed in the two previously referenced patents to McEwan, transceiver 140 can provide a digital output to microprocessor 42 which is itself indicative of the time delay between receipt of the fiducial pulse and receipt of the microwave pulse reflected at interface 127. In these instances, signal conversion circuitry 135 can be a serial-to-parallel converter, a parallel-to-serial converter, or any other suitable known methods which convert the digital data to a format which can be most efficiently used by microprocessor 42. However, it is also contemplated that the signal conversion circuitry 135 can be omitted, and transceiver 14C will provide the digital signals directly to microprocessor 42.

In operation, transmitter 100 is in communication with control room 30 over loop 20 and receives power over loop 20. Power supply 40 provides regulated voltage outputs to electronic circuitry in transmitter 100. Transmitter 100 operates in accordance with instructions stored in memory 44 under the control of microprocessor 42 at a clock rate set by system clock 50. A reset and watchdog circuit 52 monitors the supply voltage to the microprocessor and memory. During power on, circuit 52 provides a reset signal to microprocessor 42 once the supply voltage has reached a sufficient level to allow operation of microprocessor 42. Additionally, microprocessor 42 periodically provides a "kick" signal to watchdog circuit 52. If these kick pulses are not received by circuit 52, circuit 52 provides a reset input to microprocessor 42 to thereby restart microprocessor 42.

Transceiver 140 performs the above described functions such as generating, transmitting, receiving and processing microwave signals, in a known manner, for use in determining the level of process products. Level calculator 130 performs functions such as controlling transceiver 140, and communicating product level information over loop 20 through loop communicator 143. It should be understood that the particular components included in level calculator 130 are provided as examples, and that other components and configurations can be used to perform the functions of level calculator 130.

Transmitters are exposed to many harsh environmental conditions. Some likely problems encountered by transmitter 100 are ground loop errors and 50/60 Hz noise problems as well as noise at frequencies above that of the microwave signals. For intrinsic safety purposes, termination 110 is connected to a reference voltage such as earth ground. Therefore, with the twin lead termination illustrated in FIG.

3, one of leads 115 and 120 of termination 110 is connected to the reference voltage such as earth ground. This helps to prevent energy discharge which could ignite explosive gases within tank 12. Voltage source 34 in control room 30 is connected to a second reference voltage such as earth ground to provide an earth-grounded source of power for devices coupled to control loop 20. Ground loop error is caused by the considerable distances along control loop 20 which transmitter 100 may be positioned away from control room 30, which causes the two reference voltages to be different.

To minimize ground loop errors in signals from transmitter 100, termination 110 is isolated from at least low frequency signals emanating from transceiver 140 and level calculator 130 using low frequency isolators 150 and 210 in microwave signal lines 145 and 205, respectively. Such isolation eliminates ground loop problems since no direct current or other low frequency signals will be able to pass through low frequency isolator 150. Therefore, the electronics (i.e., level calculator 130 and transceiver 140) will have only a common earth ground with the power supply within control room 30. Further, if isolators 150, 210 are properly selected, the microwave signals will still be allowed to pass through isolators 150, 210 virtually unaffected due to their high frequency. Also, the impedance of isolators 150, 210 can be selected to be large enough that isolators 150 and 210 do not allow any significant 50/60 Hz energy from termination 110 into level calculator 130 and transceiver 140.

Isolating transceiver 140 and level calculator 130 from earth grounded termination 110 at a location close to termination 110 obviates the need to isolate the supply for the loop control circuitry from the supply for the sensor circuitry. This allows a single high efficiency DC-DC converter to be used to supply power to both the 4–20 mA control circuit and transceiver 140. This eliminates the need for a DC-DC transformer along with its associated efficiency losses. Not only are significant cost savings achieved, but the higher efficiency DC-DC converter provides more current by which electronics within housing 16 can be powered.

Figure 4:
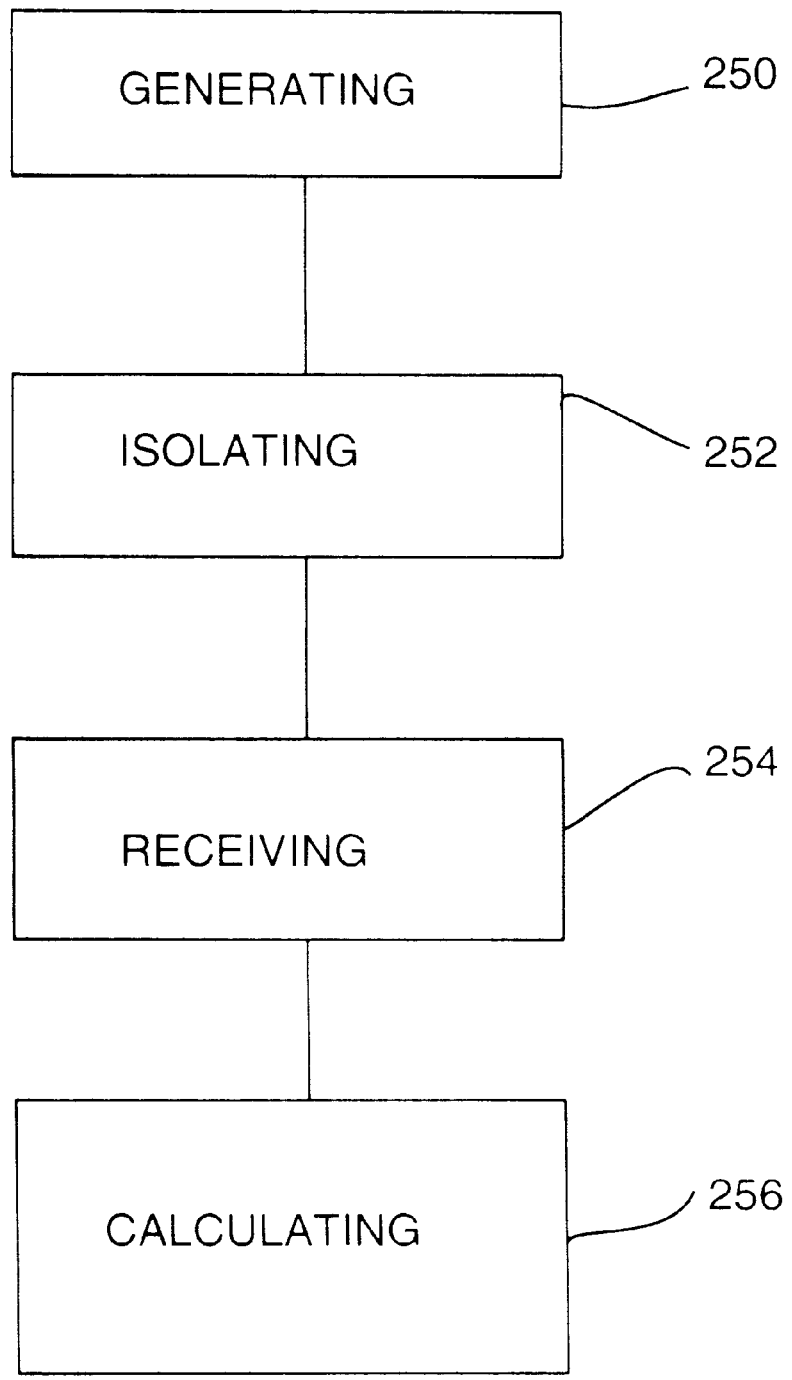
FIG. 4 is a system block diagram illustrating a method of calculating process product height in accordance with an embodiment of the invention.

FIG. 4 is a block diagram illustrating a method in accordance with an embodiment of the invention. The method begins at block 250 where a microwave signal is generated and transmitted with a microwave termination. At block 252, the microwave signal passes through at least one low frequency isolator where direct current flow is inhibited in order to reduce ground loop errors. At block 254, the reflected microwave signal is received. If the low frequency isolators are suitably selected, interference in the received signal can also be filtered during receiving block 254. At block 256, the product height is calculated based upon the received, reflected signal.

Features of the invention provide a number of significant advances over the art. For example, transmitter 100 is completely powered by power received over a 4–20 mA process control loop 20. This reduces the amount of wiring required to place transmitted 100 at remote locations. Microprocessor 42 is also capable of receiving commands over process control loop 20 sent from control room 30. This is according to a digital communications protocol, for example the HART® communication protocol or a digital communications protocol having a direct current voltage averaging zero. Embodiments of the invention achieve low frequency noise reduction, while minimizing ground loop errors. Also, embodiments of the invention achieve the noise and ground loop error reduction while increasing the safety of transmitters in explosive gas environments.

What is claimed is:

1. A low power radar level transmitter having reduced ground loop errors, the transmitter comprising:
   a termination electrically couplable to a reference voltage and extendable into a process product;
   a low power microwave transceiver electrically coupled to the termination, the transceiver being adapted to generate a microwave signal with the termination and receive a reflected microwave signal from the process product;
   a level calculator electrically coupled to the microwave transceiver;
   a loop communicator electrically coupled to the level calculator and electrically couplable to a process control loop;
   a power supply electrically coupled to the level calculator, the loop communicator, and the microwave transceiver and electrically couplable to the process control loop;
   a first low frequency isolator coupling the microwave transceiver to the termination; and
   a second low frequency isolator coupling the microwave transceiver to the reference voltage.

2. The transmitter of claim 1, wherein at least one of the low frequency isolators comprises a capacitor.

3. The transmitter of claim 2, wherein the capacitor is a discrete component.

4. The transmitter of claim 2, wherein the capacitor comprises a pair of coplanar circuit traces disposed with respect to each other to provide a capacitance.

5. The transmitter of claim 1, wherein the process control loop is a 4–20 mA process control loop.

6. The transmitter of claim 5, wherein the transmitter is powerable solely with power received front the process control loop.

7. The transmitter of claim 1, wherein the termination is a twin-line termination.

8. The transmitter of claim 1, wherein the process control loop is a two-wire process control loop.

9. The transmitter of claim 1, wherein the process control loop operates in accordance with Foundation Fieldbus.

10. The transmitter of claim 1, wherein the low power microwave transceiver is a micropower impulse radar transceiver.

11. The transmitter of claim 1, wherein the pulse width of the microwave signal ranges from about 200 picoseconds to about 2 nanoseconds.

12. A low power radar level transmitter having reduced ground loop errors, the transmitter comprising:
   a termination electrically couplable to a reference voltage and extendable into a process product;
   a low power microwave transceiver electrically coupled to the termination, the transceiver being adapted to generate a microwave signal with the termination and receive a reflected microwave signal from the process product;
   a level calculator electrically coupled to the microwave transceiver;
   a loop communicator electrically coupled to the level calculator and electrically couplable to a two-wire process control loop;
   a power supply electrically coupled to the level calculator, the loop communicator, and the microwave transceiver and electrically couplable to the two-wire process control loop;
   a first bandpass filter coupling the microwave transceiver to the termination; and a second bandpass filter coupling the microwave transceiver to the reference voltage.

13. A method of calculating a height of a process product with a low power radar level transmitter, the method comprising;

a generating a microwave signal;

passing the microwave signal through a low frequency isolator to inhibit direct current flow;

receiving a microwave signal reflected from the process product; and calculating the height of the process product based upon the received, reflected microwave signal.

14. The method of claim 13, wherein receiving the microwave signal includes filtering interference.

15. The method of claim 14, wherein the interference has a frequency of less than about 100 Hertz.

16. A low power radar level transmitter having reduced ground loop errors, the transmitter comprising:

means for guiding microwave signals, the guiding means couplable to earth ground;

means for generating a microwave signal along the guiding means and receiving a reflected microwave signal indicative of process product height;

means for calculating process product height based upon the reflected microwave signal;

means for transmitting information related to the process product height over a two-wire process control loop;

means for receiving power from the loop to power the transmitter; and means for passing microwave signals between the generating means and the guiding means, and blocking substantially all other signals.

* * * * *